June 11, 1946.　　　R. E. CROOKE　　　2,402,026
PLOTTING MECHANISM
Filed Sept. 14, 1940　　　2 Sheets-Sheet 2
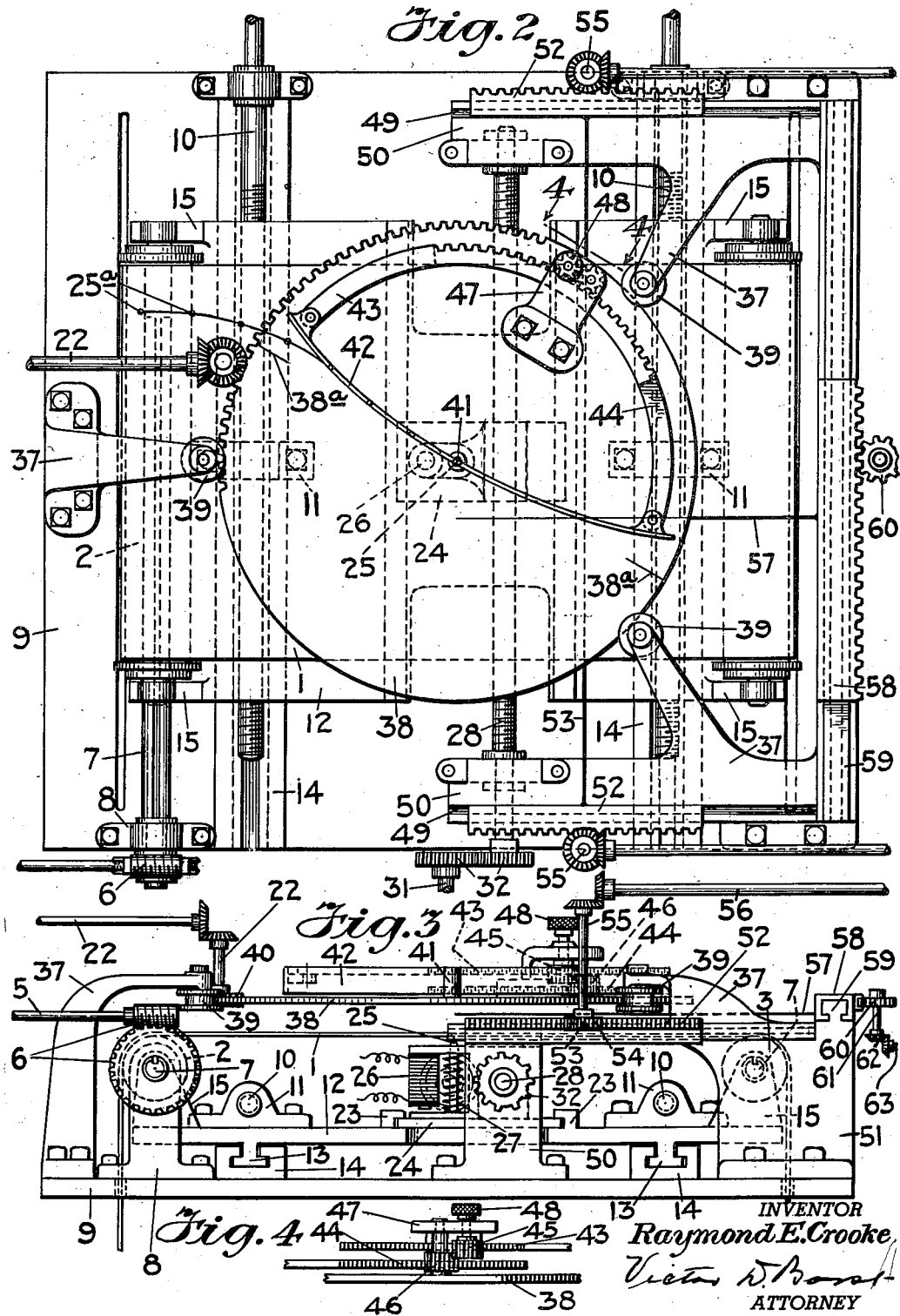
INVENTOR
Raymond E. Crooke
ATTORNEY Patented June 11, 1946

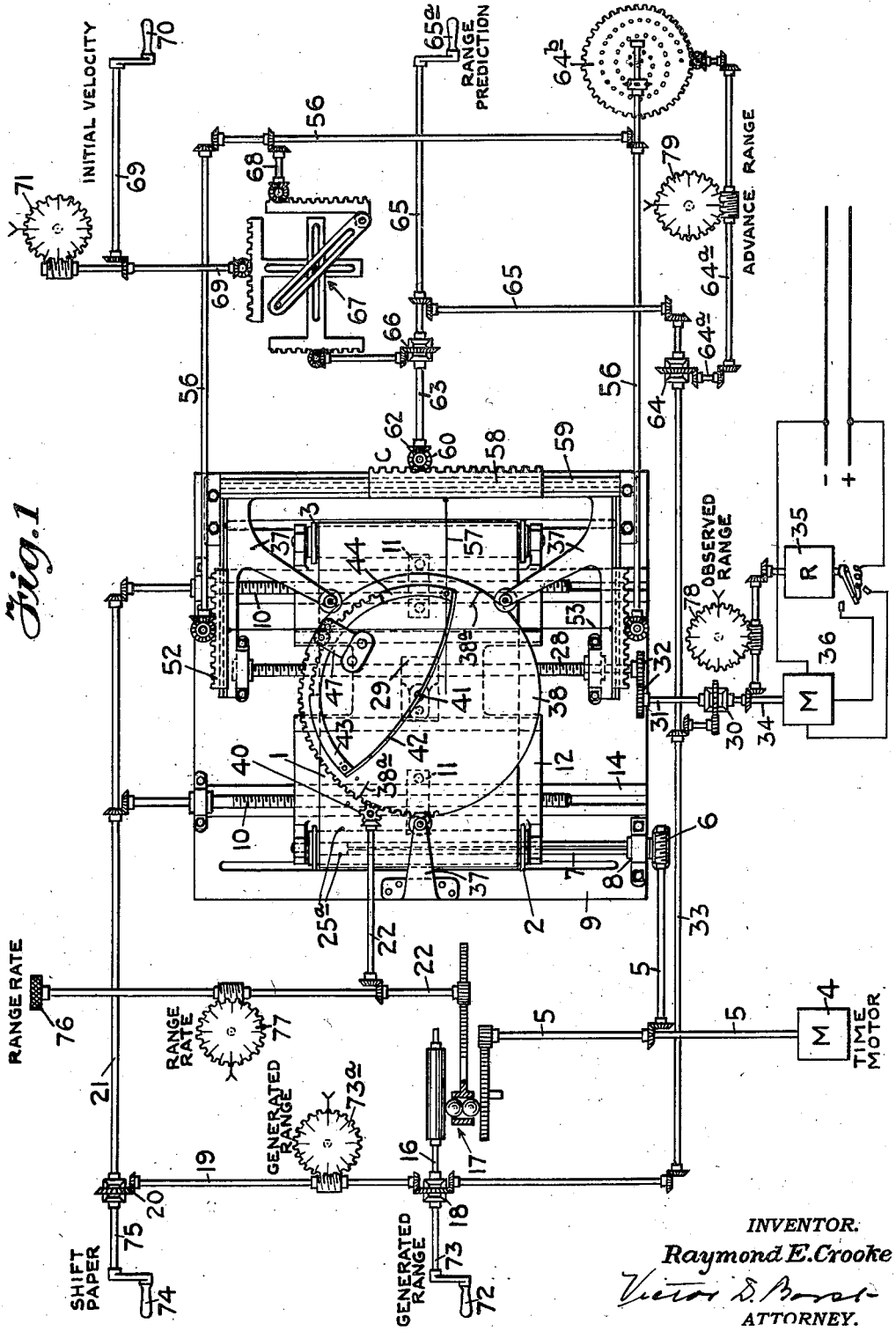

2,402,026

UNITED STATES PATENT OFFICE 2,402,026

PLOTTING MECHANISM

Raymond E. Crooke, Great Neck, N. Y., assignor to Ford Instrument Company, Inc., Long Island City, N. Y., a corporation of New York Application September 14, 1940, Serial No. 356,754

10 Claims. (Cl. 235—61.5)

This invention relates to plotters and more particularly to predicting plotters in which the rate of change of a variable is determined and used in the prediction of future values of the variable.

The principal object of this invention is to provide a mechanism that will plot a variable against some increment, such as time, and that will indicate the rate of the change of the variable.

Another object of the invention is to provide such a plotter in which it may be visually determined when the indicated rate of change of the variable is correct, i. e. when the indicated rate of change of the variable is equal to the actual rate of change of the variable.

Another object of the invention is to provide such a plotter in which two movable reference lines cooperating with the plotted points give predicted values of the variable.

Another object of the invention is to provide such a plotter in which the rate measuring reference line to which the plotted points are referred is adapted to be flexed into a curved shape to follow the general form of the plotted points and to extend beyond the points as plotted, whereby not only is the instantaneous rate of change of the variable determined but also the rate of change of the rate of change of the variable is determined and used to obtain predicted values of the variable.

Other objects will be apparent from a consideration of the specification and drawings in which:

Fig. 1 is a schematic view of the component parts of the invention;

Fig. 2 is a horizontal plan view of the plotting mechanism of the invention;

Fig. 3 is a vertical front elevation of the mechanism shown in Fig. 2; and

Fig. 4 is a vertical elevation of the mechanism taken on the line 4—4 of Fig. 2.

The invention will be described as applied to the plotting of range against time, a problem particularly met in fire control systems, but it will be understood that the construction disclosed may be used for plotting other variables against other increments and for determining their predicted values.

In the embodiment of the invention as disclosed in the accompanying drawings, the mechanism consists of a sheet of paper drawn at a constant speed over a recording device, such as a magnetically operated perforating pin, the paper being movable laterally in accordance with the range.

The instantaneous values of the rate of change of range (range rate) is obtained by measuring the slope of the recorded spots on the paper at the instant of the last recording. This is accomplished by mounting a reference line in the form of a thin, flexible blade on a transparent disk supported over the moving sheet, the center of the blade being secured at the center of the disk, which is directly over the recording device when the plotter is in adjusted operation. The disk is turned about its axis until the slope of the reference blade coincides with or is tangent to the plotted curve at the last recorded point. The slope of the reference blade may be measured by reference lines cut in the disc cooperating with scales (not shown) mounted on the frame of the instrument or the disk may be geared to a revolving scale cooperating with a reference mark.

Use is made of the rate thus determined to adjust the position of the control element of a conventional integrator, to continuously generate the range. By combining the generated range with the observed range in a differential and connecting the recording device to the output of the differential, the generated range is constantly being compared with the observed range and any differences therebetween will be indicated and known by the lateral movement of the recording device. It will thus be seen that the lateral movement of the recording device is a measure of the error in the range rate and when there is no lateral movement of the recording device it is known that the rate of change of range is correct.

When there is a movement of the recording device, the generated range is corrected through a differential connected in the output of the range integrator and the approximate range rate is corrected by manually adjusting the position of the control element of the integrator.

The range prediction, or the increase in range due to the time of flight of the projectile, is obtained by use of the right-hand portion of the reference blade which extends beyond the center of the disk in a curve corresponding to the recorded curve. The range prediction is equal to the lateral displacement from the recording point of a point on the reference blade corresponding to the time of flight of the projectile, measured in time units longitudinally along the paper. To accomplish this there is provided a transverse wire or time wire which is movable longitudinally along the paper in advance of the recording device and a longitudinal blade or range prediction blade movable transversely to the direction of movement of the paper. When the projections of the time wire and the range prediction blade intersect at a point on the projection of the reference blade, the range prediction is obtained by measuring the displacement of the longitudinal blade from the center of the disk. To obtain the advance range, that is, the range at the instant the projectile will intercept the target, the range prediction is obtained for the corresponding time-of-flight interval and is added to the present or observed range.

Referring to the drawings, 1 represents a sheet of paper drawn over rollers 2 and 3 at a constant speed by motor 4 connected to roller 2 through shaft 5, gears 6, and splined shaft 7, which is mounted in suitable bearings in support 8 secured to the base or frame 9. The rollers 2 and 3 are moved laterally to the direction of movement of the paper 1 by threaded shafts 10 engaging threaded blocks 11 mounted on a movable platform 12 with projections 13 which slide in grooved rails 14 secured to the base 9. Rollers 2 and 3 are supported on platform 12 by brackets 15. Shafts 10 are driven by the output shaft 16 of integrator 17 through differential 18, shaft 19, differential 20, and shaft 21. Integrator 17 receives its power from motor 4 through shaft 5 and its control element is adjusted in position by shaft 22 the movements of which will be described hereinafter.

Sliding between guides 23 on platform 12 is a carriage 24 which carries a recording device consisting of a paper-perforating pin 25, which is moved upwardly by electromagnet 26 against the force of the biasing spring 27 to perforate sheet 1 as at 25a. Electromagnet 26 is connected to a suitable source of electric power (not shown). Its operation will be described hereinafter.

Carriage 24 is moved transversely by threaded shaft 28 engaging threaded block 29 secured on carriage 24. Shaft 28 receives its motion from the output of differential 30 through shaft 31 and gears 32. The inputs to differential 30 are the output of integrator 17 represented by the motion of shaft 33, and shaft 34, which represents the observed range received electrically by receiver motor 35 and turned into mechanical movement by the conventional receiver relay motor and follow-up contacts, shown generally as at 36.

Supported above paper sheet 1 by brackets 37, which are secured to the base 9, is a transparent disk 38 which is free to turn about its axis on rollers 39. Teeth are cut in the edges of disk 38 and mesh with gear 40 driven by shaft 22. The angular position of disk 38 may be observed by reference marks 38a cooperating with a scale on the frame of the instrument (not shown). At the center of disk 38 is secured a lug 41 which holds centrally over the disk a thin, flexible, reference blade 42. The two ends of blade 42 are respectively secured to two arcuate racks 43 and 44 which are moved by pinions 45 and 46, respectively, which are supported on shafts journaled in disk 38 and bracket 47 (see Fig. 4). Pinions 45 and 46 mesh together and pinion 45 receives its motion by the turning of knob 48 to which it is attached.

Sliding in grooved rails 49 which are supported by blocks 50 and 51 are frames 52 which carry a transverse wire termed the time wire 53. Frames 52 receive their longitudinal motion by having teeth cut in their sides meshing with pinions 54. Pinions 54 are secured to shafts 55 which are connected by gears to shafts 56. The rotation of the shafting 56, which moves in accordance with the displacement of wire 53 from the center of the disk, represents an advance interval of time or time of flight.

Between the wire 53 and the disk 38 is positioned a longitudinal stiff blade 57 supported at one end by frame 58, which slides on a guide rail 59 mounted on the upper surface of block 51. Frame 58 receives its motion through teeth cut thereon meshing with pinion 60, which is connected by shaft 61 and gears 62 to shaft 63. Shaft 63 is moved manually by handle 65a and shaft 65, through differential 66. When the projections of time wire 53 and range prediction blade 57 intersect at a point on the right-hand half of blade 42, the position of shaft 63, which is moved in accordance with the displacement of blade 57 from the center of the disk 38, represents the range prediction for an interval of time corresponding to the displacement of time wire 53 from the center of the disk 38.

The motion of shaft 33 representing generated range is combined in differential 64 with the motion of shaft 65. The output of differential 64, which is the combination of the generated or present range and the range prediction and is the advance range, is represented by the motion of shaft 64a, which is connected to a conventional time of flight converter 64b, such as that shown in Patent No. 1,904,215 of Hannibal C. Ford. The output of the time of flight converter 64b drives shaft 56 to represent the time of flight of the projectile.

As shaft 56 is connected to frames 52, it will be seen that when frames 52 and wire 53 are moved over the sheet in advance of the recorded points a distance equal to the time of flight of the projectile, the projection of wire 53 forms with blade 42 a reference point which by its lateral distance from the center of the disk indicates the range prediction. The range prediction is determined by moving frame 58 until the projection of blade 57 intersects this point. The lateral displacement of blade 57 from the center of disk 38 is a measure of the range prediction.

To apply this invention to the firing of projectiles having different initial velocities without removing and replacing different time of flight converter disks and so that the advance range output may be used for determining the ballistic factors for the gun, such as tangent elevation, there is provided a conventional multiplier shown generally at 67 by which the indicated advance range is modified for differences in initial velocities. Shaft 56 representing time of flight is connected to one input shaft 68 of multiplier 67. The other input, shaft 69, is moved by handle 70 in proportion to the variations of the actual initial velocity from the initial velocity for which the disk of converter 64b and the other ballistic factors are calibrated. The value of the crankedin initial velocity is visually available by indicator dial 71 connected to shaft 69. The output of the multiplier 67 is connected to shafts 63 and 65 by differential 66.

Handle 72, connected to differential 18 by shaft 73, permits changes in the generated range to be cranked into the system. The present generated range is made visually available by dial 73a connected to shaft 19. Handle 74, connected to differential 20 by shaft 75, permits of arbitrary movement of the paper carrying rolls with reference to the recording device. Knob 76 connected to shaft 22, permits of the setting of disk 38 and the control element of integrator 17. The instantaneous range rate is made visually available by dial 77 connected to shaft 22. The instantaneous observed range and advance range are made visually available by dials 78 and 79 connected respectively to shafts 34 and 64a. The threaded shaft 28 is adjusted relative to shaft 31 by means of gears 32 so that the perforating pin 25 is directly under the lug 41 when the generated range dial 73a and the observed range dial 78 read the same. Thereafter any displacement of the pin and therefore of the plotted points from the center of the disk 38 will indicate a discrepancy between the generated and observed values of range.

*Operation*

The instrument described as an embodiment of the invention is placed in operation by starting the motor 4 which drives the paper 1 to the left and rotates the disk of the integrator 17. If the operator has information relative to the rate of change of range the rate control member of integrator 17 is set to this rate by turning knob 76 to bring the range rate dial 77 to the proper reading. If no information is available the range rate should be set at zero.

As observed ranges are received by the receiver motor 35 the recorder or perforating pin 25 will be moved in a direction parallel to the threaded shaft 28 and relative to the moving paper by the relay 36. The electromagnet 26 is energized, preferably by the range finder operator, when values of the observed ranges are ascertained. This energization of electromagnet 26 causes the perforating pin 25 to perforate the paper 1 as shown at 25a. As soon as two or three observed ranges are recorded the plotter operator sets the generated range, by means of handle 72, to the same value as the observed range. The operator is aided in making this setting by bringing the perforating pin 25 directly under the lug 41 at the center of the transparent disk 38. This operation will also shift the paper so that an extension of a line passing through the perforations already made will be in line with the center of the transparent disk 38. The setting of the generated range by means of handle 72 positions the perforating pin 25 through the shaft 73, differential 18, shaft 33, differential 30, shaft 31, gears 32 and threaded shaft 28. The paper 1 is shifted a like amount and in the same direction as the perforating pin 25, by the shaft 73, differential 18, shaft 19, differential 20, shaft 21, threaded shafts 10, threaded blocks 11, and the movable platform 12. This operation will set the generated range dial 73a the same as the observed range dial 78. These dials may be concentric for ease of operation. The range rate may now be set to the proper rate by turning the disk 38 by knob 76, to superpose the blade 42 over the perforations representing the observed range. This operation will set the rate control element of integrator 17 to the proper rate and the generated range will stay matched with the observed values as long as the range rate set up is correct. If there is any discrepancy between the generated range and the observed range due to incorrect rate setting or change of rate, it may be observed on the dials 73a and 78 or by the fact that the extension of the perforated record, which indicates the position of the perforating pin 25, will not pass under the lug 41 at the center of disk 38. As soon as a discrepancy between the generated and observed range values is noted the generated range is corrected by turning handle 72 to shift the plot transversely, and the range rate is corrected by turning the disk 38 by the knob 76 so that the plotted points and blade 42 coincide.

When the correct range rate is set up, the generated range values remain equal to the observed values and the perforating pin 25 will remain stationary under the lug 41 due to the original setting of threaded shaft 28 relative to the output of differential 30. At the same time that integrator 17 is acting through shaft 16, differential 18, shaft 33 and differential 30 to neutralize the effect on the perforating pin 25 of the observed range from relay 36 and shaft 34, the integrator 17 is acting through shaft 16, differential 18, shaft 19, differential 20, shaft 21, threaded shafts 10 and movable platform 12 to shift the paper 1 transversely. The paper is thus shifted relative to the perforating pin 25 in accordance with the generated range values. If the generated values differ from the observed values differential 30 will operate to shift the perforating pin 25 relative to the lug 41 so that the actual relative movement between the paper and the perforating pin always represents the observed range.

In starting the plot the flexible blade 42 should be straight as set by knob 48. As soon as the proper present range rate is obtained it will be noted that under most conditions the range rate and therefore the slope of the plot is continually changing. The plot therefore appears as a curve rather than a straight line. The knob 48 should be turned to flex the blade 42 so that it agrees with the curve of the plot.

If the plot approaches either edge of the paper it may be shifted to the desired part of the paper by means of the handle 74. This operation will shift the paper relative to the disk 38 and the perforating pin 25 and thereby will shift the plot on the paper without affecting the slope of the curve or moving the perforating pin 25 or the subsequently plotted curve relative to the blade 42.

The right-hand half of the blade 42 will assume the same curvature as the left-hand half and is used to obtain the range prediction. Shaft 33, the motor of which represents the generated range, rotates shaft 64a through differential 64 thus setting up the generated range in the conventional time of flight converter 64b, the output of which moves shaft 56. The rotation of shaft 56 causes frames 52 and wire 53 to move to the right of the center of disk 38 a distance corresponding to the time of flight of the projectile at a scale corresponding to the rate of movement of the paper. The wire 53 is thereby displaced to the right of the center of the disk 38 a distance equal to the movement of the paper by motor 4 during an interval equal to the time of flight represented by the rotation of shaft 56. Frame 58 is then moved manually by handle 65a, shaft 65 and differential 66 until the projections of blade 57, wire 53 and blade 42 intersect at one point. The displacement of blade 57 and frame 58 from their central position is a measure of the range prediction or the change of range during the time of flight. The motion of shaft 65, which represents the range prediction, is transmitted to shaft 64a through differential 64, where it is combined with the present generated range received from shaft 33. Dial 79 connected to shaft 64a thereby indicates the advanced range. It will be observed that the resultant motion of shaft 64a will cause the time of flight converter 64b to be set to the advance range and hence cause shafts 56 to represent time of flight for the advance range. Frames 52 and wire 53 will be moved to positions corresponding thereto. When blade 57 is brought to the new intersection the error caused by setting the time of flight converter first to the generated range is corrected automaticlly. The advance range indicated by dial 79 may be observed locally or it may be transmitted to other fire control positions by any well known means.

In case the projectile being fired does not have the same initial velocity as that for which the time of flight converter and other ballistic factors of the gun to be controlled have been calibrated, the advance range is modified by the multiplier 67 by turning handle 70 until the dial 71 indicates the initial velocity of the fired projectile. The required modification to the advance range, due to variations in initial velocity, may be assumed to be proportional to the variation of the actual initial velocity from the velocity for which the ballistics are determined, multiplied by the time of flight. For example, assume a reduction of ninety feet per second from the standard initial velocity, which amounts to thirty yards per second. If the time of flight is twenty seconds the resulting increase of six hundred yards to the advance range will give time of flight and other ballistic factors substantially correct for the reduced velocity and the actual advance range. It may be desirable to include a modifying factor in the multiplication, the value of this factor being determined from the ballistics of the particular gun considered.

It is obvious that various changes may be made by those skilled in the art in the details of the embodiment of the invention disclosed in the drawings and described above without departing from the spirit and scope of the invention as expressed in the appended claims.

I claim:

1. A plotter including a plotting sheet movable longitudinally and transversely over a frame comprising means for moving the sheet longitudinally over the frame in accordance with values of one factor to be plotted, a recording device movable transversely over the frame, means for moving the recording device relative to the sheet in accordance with values of a second factor to be plotted, and means for jointly moving the sheet and the recording device transversely over the frame.

2. A plotter including a plotting sheet movable longitudinally and transversely over a frame, comprising means for moving the sheet longitudinally over the frame in accordance with values of one factor to be plotted, a recording device movable transversely over the frame, means including a differential for simultaneously moving the sheet and the recording device transversely over the frame and means for actuating the differential to move the recording device transversely relative to the sheet in accordance with values of the second factor to be plotted.

3. A plotter including a plotting sheet movable longitudinally and transversely over a frame, comprising means for moving the sheet longitudinally over the frame in accordance with the values of one factor to be plotted, a recording device movable transversely over the frame, means for moving the recording device relative to the sheet in accordance with values of a second factor to be plotted, means for jointly moving the sheet and the recording device transversely over the frame, and a blade mounted for angular movement over the sheet about an axis fixed relative to the frame.

4. A plotter including a plotting sheet movable longitudinally and transversely over a frame, comprising means for moving the sheet longitudinally over the frame in accordance with the values of one factor to be plotted, a recording device movable transversely over the frame, means for moving the recording device relative to the sheet in accordance with values of a second factor to be plotted, means for jointly moving the sheet and the recording device transversely over the frame, a blade mounted for angular movement over the sheet about an axis fixed relative to the frame, and means for angularly moving the blade about its axis.

5. A plotter including a plotting sheet movable longitudinally and transversely over a frame, comprising means for moving the sheet longitudinally over the frame in accordance with values of one factor to be plotted, a recording device movable transversely over the frame, means for moving the recording device relative to the sheet in accordance with values of a second factor to be plotted, means for jointly moving the sheet and the recording device transversely over the frame, a transparent disk mounted for angular movement over the sheet about an axis fixed relative to the frame, a flexible blade mounted at its center on the center of the disk, means on the disk for flexing the blade, and means for angularly moving the disk.

6. A plotter including a plotting sheet movable longitudinally and transversely over a frame, comprising means for moving the sheet longitudinally over the frame in accordance with the values of one factor to be plotted, a recording device movable transversely over the frame, means for moving the recording device relative to the sheet in accordance with values of a second factor to be plotted, means for jointly moving the sheet and the recording device transversely over the frame, a blade mounted for angular movement over the sheet about an axis fixed relative to the frame, means for angularly moving the blade about its axis to superpose the blade over the plotted values, a second frame movable longitudinally over the first mentioned frame, a transverse wire carried by the second frame, a third frame movabe transversely over the first mentioned frame, a second blade extending at right angles from and carried by the third frame, means for moving the second frame and the transverse wire to selected positions relative to the recording device, and means for moving the third frame to position the second blade relative to the intersection of the first blade and the transverse wire.

7. A plotter including a plotting sheet movable longitudinally and transversely over a frame, comprising means for moving the sheet longitudinally over the frame in accordance with the values of one factor to be plotted, a recording device movable transversely over the frame, means for moving the recording device relative to the sheet in accordance with values of a second factor to be plotted, a blade mounted for angular movement over the sheet about an axis fixed relative to the frame, means for angularly moving the blade about its axis to superpose the blade over the plotted values, an integrator having an adjustable rate member and an output member the rate of rotation of which is proportional to the adjustment of the rate member, means actuated by the blade moving means for adjusting the rate member of the integrator in accordance with the angular position of the blade and means actuated in part by the rotation of the output member of the integrator for jointly moving the sheet and the recording device transversely over the frame.

8. A range plotter including a plotting sheet movable longitudinally and transversely over a frame, comprising means for moving the sheet longitudinally over the frame at a constant velocity, an integrator having an adjustable rate member and an output member the rate of rotation of which is proportional to the adjustment of the rate member, a shaft rotatable in accordance with values of range and actuated in part by the output member, a recording device movable transversely over the frame, means including a differential for simultaneously moving the sheet and the recording device transversely over the frame in accordance with the rotation of the range shaft, a second shaft rotatable in accordance with values of observed range, means connecting the second shaft to the differential to move the recording device relative to the sheet in accordance with the values of observed range, a blade mounted for angular movement over the sheet about an axis fixed relative to the frame, means for angularly moving the blade about its axis to superpose the blade over the plotted values, and means actuated by the blade moving means for adjusting the rate member of the integrator in accordance with the angular position of the blade.

9. A predicting range plotter including a plotting sheet movable longitudinally and transversely over a frame, comprising means for moving the sheet longitudinally over the frame at a constant velocity, an integrator having an adjustable rate member and an output member the rate of rotation of which is proportional to the adjustment of the rate member, a shaft rotatable in accordance with values of range and actuated in part by the output member, a recording device movable transversely over the frame, means including a differential for simultaneously moving the sheet and the recording device transversely over the frame in accordance with the rotation of the range shaft, a second shaft rotatable in accordance with values of observed range, means connecting the second shaft to the differential to move the recording device relative to the sheet in accordance with the values of observed range, a blade mounted for angular movement over the sheet about an axis fixed relative to the frame, means for angularly moving the blade about tis axis to superpose the blade over the plotted values, means actuated by the blade moving means for adjusting the rate member of the integrator in accordance with the angular position of the blade, a second frame movable longitudinally over the first mentioned frame, a transverse wire carried by the second frame, a third frame movable transversely over the first mentioned frame, a second blade extending at right angles from and carried by the third frame, a time of flight converter having an input, the movement of which represents range, and an output, the movement of which represents time of flight, means including a second differential for actuating the input of the time of flight computer in accordance with the rotation of the range shaft, means for positioning the second frame in accordance with the movement of the output of the time of flight converter, means for moving the third frame to position the second blade relative to the intersection of the first blade and the transverse wire, and means for actuating the second differential in accordance with the movement of the third frame to modify the input to the time of flight converter.

10. A predicting range plotter including a plotting sheet movable longitudinally and transversely over a frame, comprising means for moving the sheet longitudinally over the frame at a constant velocity, an integrator having an adjustable rate member and an output member the rate of rotation of which is proportional to the adjustment of the rate member, a shaft rotatable in accordance with values of range and actuated in part by the output member, a recording device movable transversely over the frame, means including a differential for simultaneously moving the sheet and the recording device transversely over the frame in accordance with the rotation of the range shaft, a second shaft rotatable in accordance with values of observed range, means connecting the second shaft to the differential to move the recording device relative to the sheet in accordance with the values of observed range, a blade mounted for angular movement over the sheet about an axis fixed relative to the frame, means for angularly moving the blade about its axis to superpose the blade over the plotted values, means actuated by the blade moving means for adjusting the rate member of the integrator in accordance with the angular position of the blade, a second frame movable longitudinally over the first mentioned frame, a transverse wire carried by the second frame, a third frame movable transversely over the first mentioned frame, a second blade extending at right angles from and carried by the third frame, a time of flight converter having an input, the movement of which represents range, and an output, the movement of which represents time of flight, means including a second differential for actuating the input of the time of flight computer in accordance with the rotation of the range shaft, means for positioning the second frame in accordance with the movement of the output of the time of flight converter, means for moving the third frame to position the second blade relative to the intersection of the first blade and the transverse wire, means for actuating the second differential in accordance with the movement of the third frame to modify the input to the time of flight converter, multiplying means having an output element and two input elements, means for selectively setting one of said input elements, means for adjusting the second of said input elements in accordance with the output of the time of flight converter and means to modify the means for actuating the second differential in accordance with the position of the output element of the multiplying means.

RAYMOND E. CROOKE.